US008232704B2

(12) United States Patent
Qin et al.

(10) Patent No.: US 8,232,704 B2
(45) Date of Patent: Jul. 31, 2012

(54) ELECTRIC MOTOR

(75) Inventors: Rui Feng Qin, Hong Kong (CN); Fei Liu, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 321 days.

(21) Appl. No.: 12/623,043

(22) Filed: Nov. 20, 2009

(65) Prior Publication Data

US 2010/0127593 A1　May 27, 2010

(30) Foreign Application Priority Data

Nov. 21, 2008　(CN) .......................... 2008 1 0217601

(51) Int. Cl.
*H02K 1/26* (2006.01)

(52) U.S. Cl. ..... 310/216.012; 310/156.38; 310/216.043; 310/216.074; 310/216.096; 310/216.112

(58) Field of Classification Search ............. 310/156.38, 310/156.43–45, 216.004, 216.012, 216.043, 310/216.053, 216.061, 216.074, 216.091, 310/216.092, 216.094, 216.096, 216.097, 310/216.111, 216.112

See application file for complete search history.

(56) References Cited

U.S. PATENT DOCUMENTS

| | | | |
|---|---|---|---|
| 4,644,233 A | 2/1987 | Suzuki | |
| 4,700,098 A | 10/1987 | Kawashima | |
| 4,704,567 A | 11/1987 | Suzuki et al. | |
| 4,994,702 A * | 2/1991 | Arita | 310/216.097 |
| 6,075,302 A * | 6/2000 | McCleer | 310/166 |
| 6,157,102 A * | 12/2000 | Suzuki et al. | 310/44 |
| 6,236,132 B1 * | 5/2001 | Saito et al. | 310/216.097 |
| 6,271,613 B1 * | 8/2001 | Akemakou et al. | 310/181 |
| 6,864,611 B1 * | 3/2005 | Wobben | 310/162 |
| 2008/0224562 A1 * | 9/2008 | Qin et al. | 310/216 |

FOREIGN PATENT DOCUMENTS

JP　2001186743　6/2001

\* cited by examiner

*Primary Examiner* — Quyen Leung
*Assistant Examiner* — Naishadh Desai
(74) *Attorney, Agent, or Firm* — Muncy, Geissler, Olds & Lowe, PLLC

(57) ABSTRACT

An electric motor comprises a stator and a rotor rotatably mounted confronting the stator. The rotor has a rotor core which comprises at least a first tooth, a second tooth and a third tooth which are adjacent. Each of the teeth comprises a rib section radially and outwardly extending from a core and a tooth section located at an outer end of the rib section. The angle between the first tooth and the second tooth is n degrees, wherein when the rotor core is rotated n degrees to move the first tooth towards the second tooth, the rotated second tooth does not coincide with the pre-rotated third tooth.

18 Claims, 3 Drawing Sheets

ELECTRIC MOTOR

CROSS REFERENCE TO RELATED APPLICATIONS

This non-provisional patent application claims priority under 35 U.S.C. §119(a) from Patent Application No. 200810217601.2 filed in The People's Republic of China on Nov. 21, 2008.

FIELD OF THE INVENTION

This invention relates to an electric motor and in particular, to a rotor core of an electric motor.

BACKGROUND OF THE INVENTION

Electromagnetic noise is emitted when a motor is operating. One element of electromagnetic noise is harmonic noise. Harmonic noise is mainly caused by the motor's torque ripple. For example, when a permanent magnet direct current (PMDC) motor is operating, the position of the coils with respect to the stator and the current through the windings varies periodically, which results in a periodic torque ripple. FIG. 3 is a cross sectional view of a twelve slot rotor core of a conventional motor. In such a conventional motor, harmonic noise comprises the 12th order harmonic noise and its integral multiple level harmonic noise, such as 24th order harmonic noise, 36th order harmonic noise, etc.

It's desired to eliminate or at least reduce harmonic noise to make people feel more comfortable, especially in HVAC (heating, ventilation and air-conditioning) applications. One known way to reduce harmonic noise is to provide the rotor poles with grooves running axially along the pole face. These grooves, known as dummy slots as they have no windings laid therein, allow the motor to function as though it has a greater number of poles in terms of harmonic noise but still being easy to manufacture.

However, the air gap between rotor and the stator is increased due to the dummy slots, and motor performance is decreased. Therefore, there is a desire for an improved motor having a reduced harmonic noise.

SUMMARY OF THE INVENTION

Accordingly, in one aspect thereof, the present invention provides a rotor core for an electric motor, comprising at least a first tooth, a second tooth adjacent the first tooth and a third tooth adjacent the second tooth, each of said teeth comprising a rib section radially and outwardly extending and a tooth section located at outer end of said rib section, the angle between the first tooth and the second tooth being n degrees, wherein when the rotor core is rotated n degrees to move the first tooth towards the second tooth, the rotated second tooth does not coincide with the pre-rotated third tooth.

Preferably, the angle between the rib section of the first tooth and the rib section of the second tooth is larger or smaller than the angle between the rib section of the second tooth and the rib section of the third tooth.

Preferably, one angle between two adjacent rib sections of the teeth is equal to a base angle defined by dividing 360° by the number of teeth, and at least one angle between two adjacent rib sections of said teeth is equal to the base angle +Δθ, wherein Δθ is from 1% to 40% of the base angle.

Preferably, the rotor core comprises twelve teeth, at least one angle between two adjacent rib sections being equal to 30°, at least one angle between two adjacent rib sections being equal to 28°, at least one angle between two adjacent rib sections being equal to 32°.

Preferably, the circumferential width of the tooth section of the second tooth is larger or smaller than the circumferential width of the tooth section of the third tooth.

Preferably, winding slots are formed between adjacent teeth and have winding slot openings between adjacent tooth sections, the circumferential width of one winding slot opening being larger than that of another winding slot openings; or the circumferential width of the winding slot openings being the same, and the all the angles between adjacent winding slot openings are not the same.

Preferably, one angle between two adjacent winding slot openings is equal to a base angle defined by dividing 360° by the number of teeth, and at least one angle between two adjacent winding slot openings is equal to the base angle +Δφ, wherein Δφ is from 1% to 40% of the base angle.

Preferably, the rotor core comprises twelve teeth and twelve winding slots, at least one angle between two adjacent winding slot openings being equal to 30°, at least one angle between two adjacent winding slot openings being equal to 32°, at least one angle between two adjacent winding slot openings being equal to 28°.

Preferably, the number of coil turns deposited in the winding slot between said first tooth and said second tooth is larger or smaller than the number of coil turns deposited in the winding slot between said second tooth and said third tooth.

Preferably, the circumferential width of rib section of said second tooth is larger or smaller than that of rib section of said third tooth.

Preferably, when the angles between adjacent teeth are not all equal, the circumferential width of each tooth section is the same.

According to a second aspect, the present invention also provides an electric motor incorporating a rotor core as described above.

BRIEF DESCRIPTION OF THE DRAWINGS

Two preferred embodiments of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
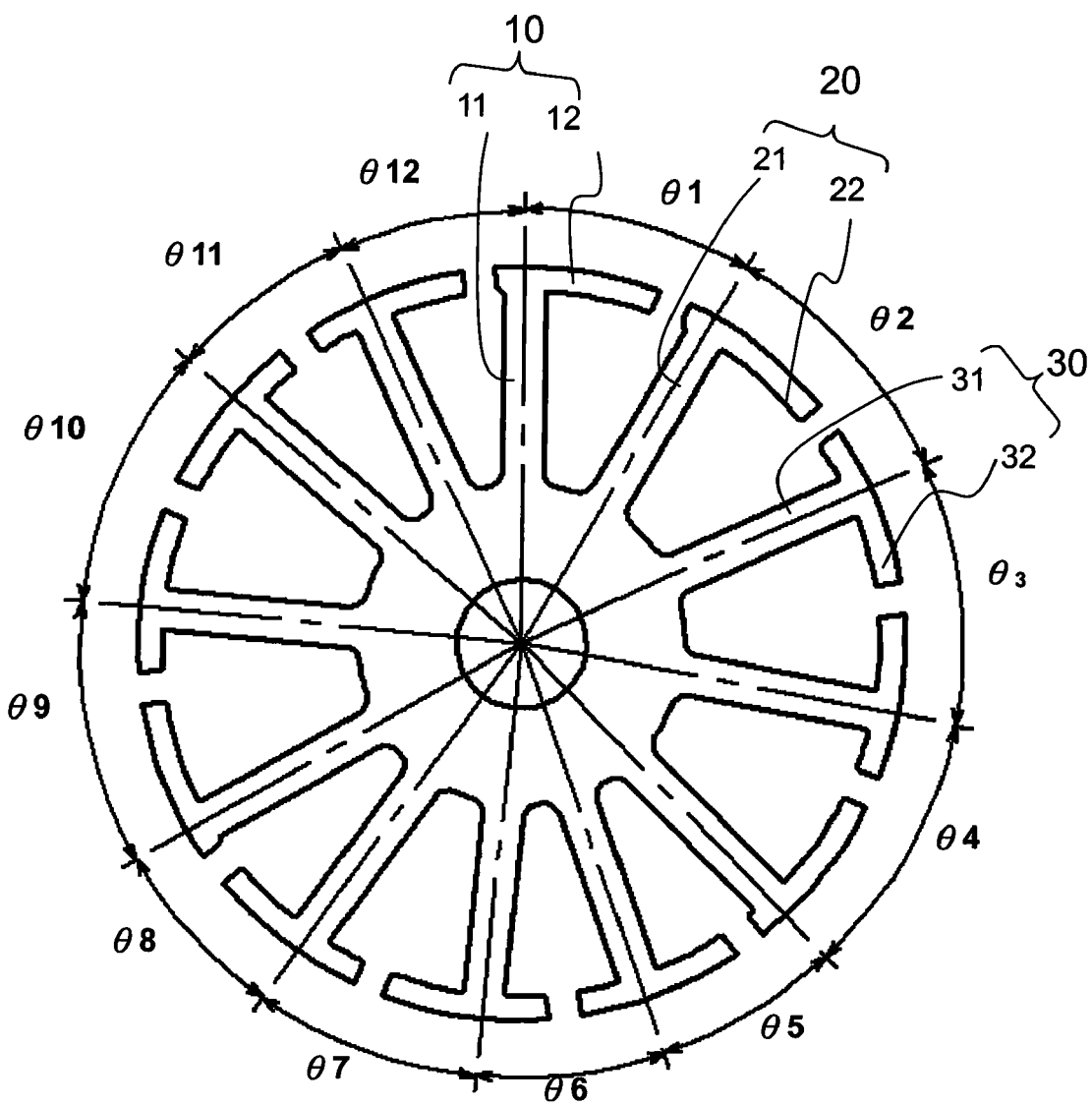
FIG. 1 is a sectional view of a rotor core of a motor in accordance with a first embodiment of the present invention.

FIG. 1 illustrates a sectional view of a motor in accordance to one embodiment of the present invention. The rotor core comprises twelve teeth. Each tooth, such as tooth 10, comprises a rib section 11 which radially and outwardly extends from a ring shape core center and a tooth section 12 which locates at the outward end of the rib section 11 and expands in a circumferential direction. Similarly, tooth 20 comprises a rib section 21 and a tooth section 22, and tooth 30 comprises a rib section 31 and a tooth section 32, etc.

In this embodiment, each angle between adjacent teeth is represented by references θ1~θ12 respectively. Each angle is measured from the radial center line of one tooth to the radial center line of the adjacent tooth. For example, angle θ1 is the angle between tooth 10 and tooth 20 and is measured from the radial center line of the rib section 11 of tooth 10 to the radial center line of the rib section 21 of tooth 20. Similarly, angle θ2 is measured from the radial center line of rib section 21 of tooth 20 to radial center line of the rib section 31 of tooth 30, etc.

In this embodiment, there are twelve teeth distributed asymmetrically. The value in degrees of angles θ1~θ12 is 30°, 30°+Δθ, 30°Δθ, 30°+Δθ, 30°−Δθ, 30°−Δθ, 30°, 30°−Δθ, 30°+Δθ, 30°+Δθ, 30°Δθ, 30°−Δθ, respectively, wherein 30° is a base angle defined by dividing 360° by the number of winding slots or teeth, and Δθ is a variable. It is preferable that the variable Δθ is from 1% to 40% of the base angle. In this embodiment the variable Δθ is equal to 2°.

As mentioned above, the angle θ1 is not equal to the angle θ2. Therefore, when the rotor rotates 30° (i.e., the value of angle θ1) in a direction which moves tooth 10 towards tooth 20, rib section 11 of the rotated tooth 10 will coincide with the position of the rib section 21 of the pre-rotated tooth 20, while rib section 21 of the rotated tooth 20 will not coincide with the position of the rib section 31 of the pre-rotated tooth 30. In other words, the value of all angles θ1~θ2 is not the same, therefore, when the rotor core is rotated through a predetermined angle, the rotated rotor core will not coincide with the pre-rotated rotor core. Original variation regularity of magnetic field is changed due to asymmetry of the rotor core. When the rotor core is rotated 360°, the torque ripple of the motor varies irregularly, which reduces the harmonic noise. As the harmonic noise is reduced by an asymmetric rotor core, the air gap between the rotor core and the stator is not changed. It should be noted that the circumferential extent of the tooth section is the same for all of the teeth.

In the embodiment described above, the rotor core comprises twelve teeth, and the angles between the rib sections of adjacent teeth are not the same, but the present invention should not be limited to this configuration. Alternatively, the circumferential width of rib sections of the teeth may not be the same, while the angle between adjacent rib sections is the same. Furthermore, the number of turns of coils deposited in winding slots can be different to meet specific requirement.

Embodiment Two

Figure 2:
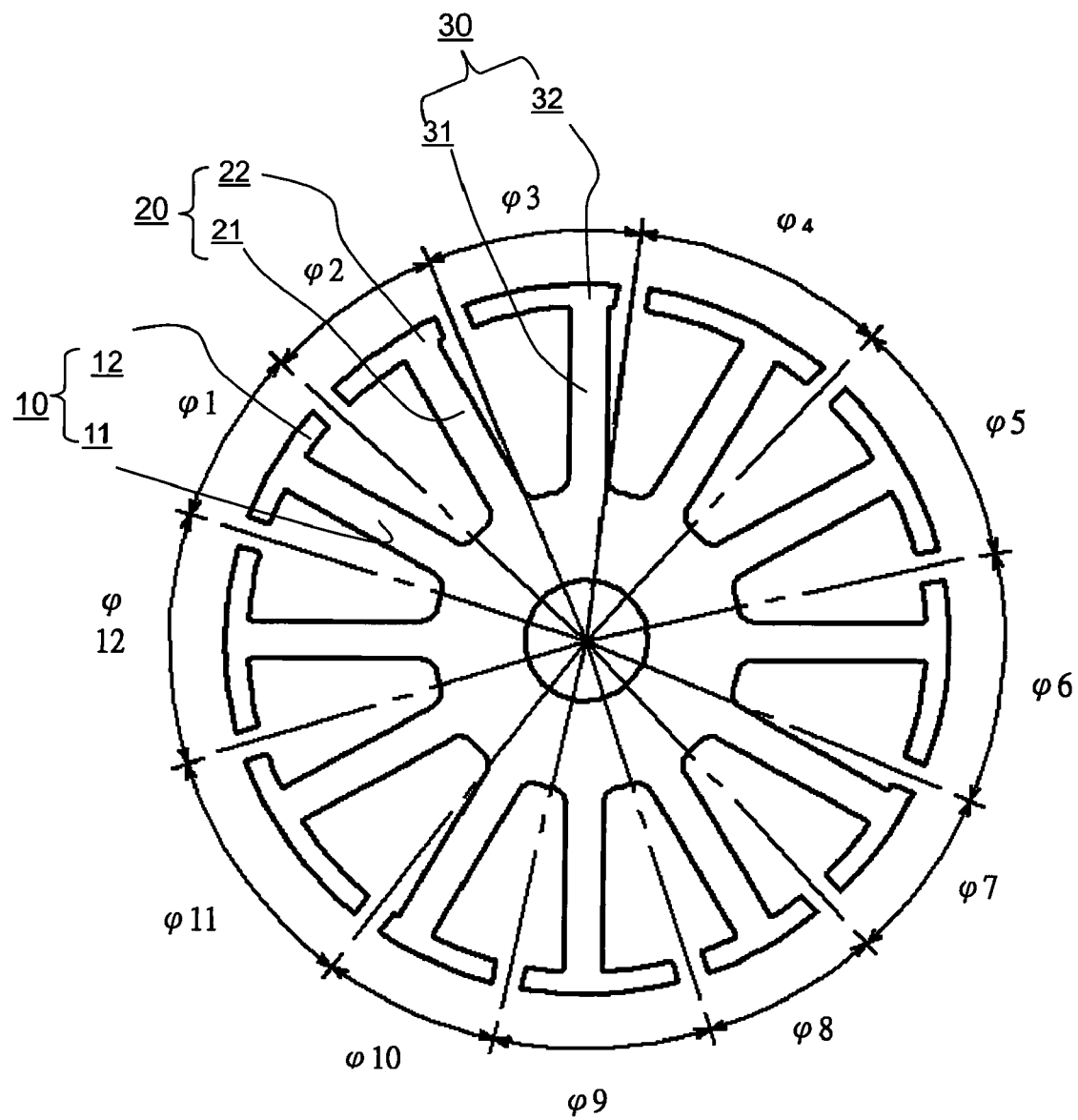
FIG. 2 is sectional view of a rotor core of a motor in accordance with a second embodiment of the present invention.
Figure 3:
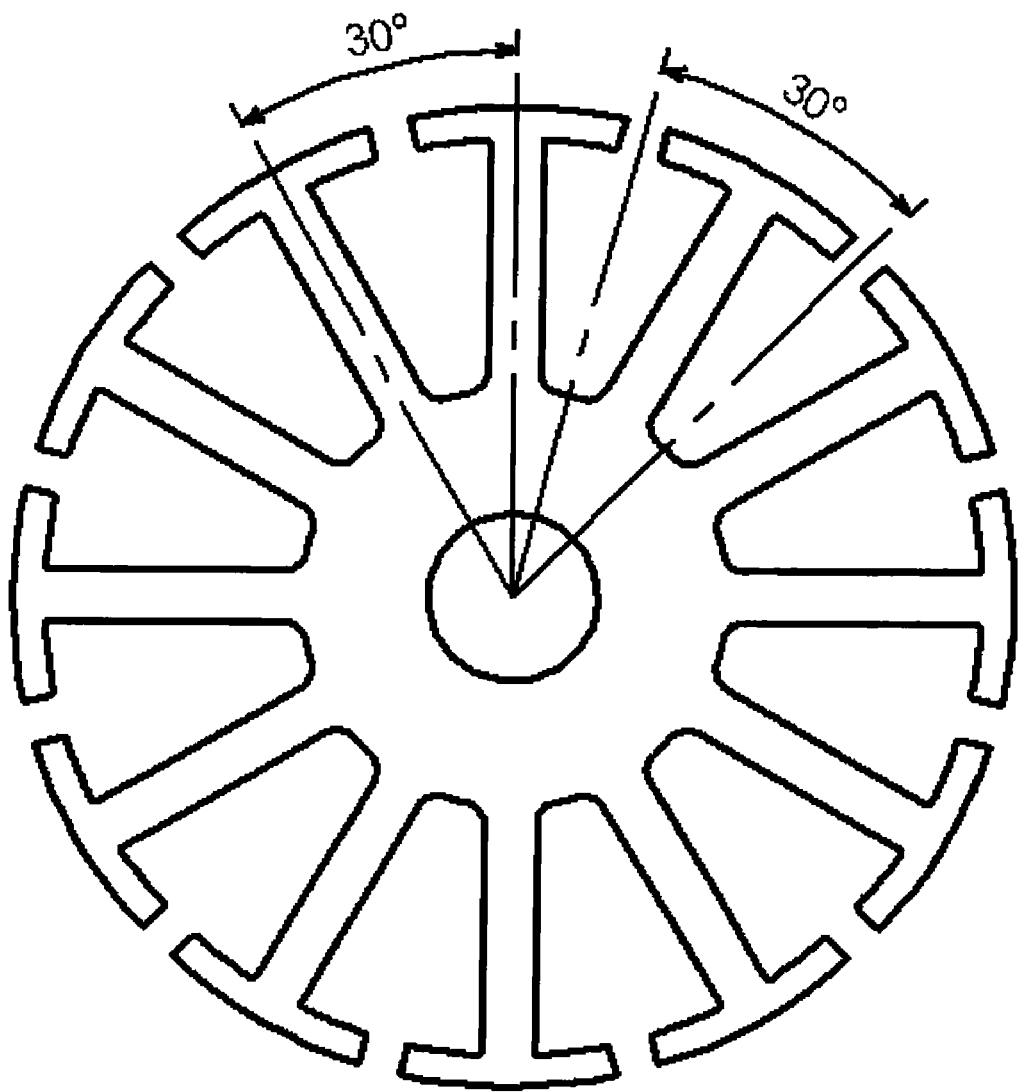
FIG. 3 is a sectional view of a rotor core of a conventional motor.

FIG. 2 shows a cross section of a rotor core of a motor in accordance to another embodiment of the present invention. The rotor core comprises twelve teeth, each of which comprises a rib section extending radially and outwardly from a core and a tooth section located at the outer end of the rib section. For example, tooth 10 comprises a rib section 11 and a tooth section 12, and tooth 20 comprises a rib section 21 and a tooth section 22, etc.

In this embodiment, the twelve rib sections are evenly distributed circumferentially about the rotor core. In other words, all the rib sections are arrayed symmetrically. However, the circumferential width of the twelve tooth sections is not the same. For example, the circumferential width of tooth section 22 is smaller than that of adjacent tooth section 32. Therefore, when tooth 20 is rotated towards tooth 30, tooth section 22 of the rotated tooth 20 will overlap but not totally coincide with the position of tooth section 32 of the pre-rotated tooth 30. As is known, a winding slot opening is formed between adjacent tooth sections. Since tooth sections are not distributed symmetrically along a circumferential direction of the rotor core, the winding slot openings are not distributed symmetrically. However, in the preferred embodiment, the circumferential width of all winding slot openings is the same.

Thus the value of the angles between adjacent winding slot openings is not the same. The angle between two adjacent winding slot openings is measured from the radial center line of one winding slot opening to the radial center line of the adjacent winding slot opening. Referring to FIG. 2, the twelve angles formed between adjacent winding slot openings are represented by angles φ1~φ12, respectively, wherein angle φ1 is the angle between the two winding slots that are separated by tooth 10, and angle φ2 is the angle between the two adjacent winding slots that are spaced by tooth 20, etc. The values in degrees of angles φ1~φ12 are 30°−Δφ, 30°−Δφ, 30°, 30°+Δφ, 30°+Δφ, 30°+Δφ, 30°−Δφ, 30°Δφ, 30°, 30°−Δφ, 30°+Δφ and 30°+Δφ, respectively, wherein 30° is a base angle defined by dividing 360° by the number of winding slots, and Δφ is a variable preferably from 1% to 40% of the base angle. In this embodiment, Δφ is equal to 2°.

In this embodiment, original variation regularity of magnetic field and original torque ripple periodicity is broke by the asymmetrical distribution of winding slot openings, which results in a reduced harmonic component and reduced harmonic noise. Furthermore, air gap between the rotor core and motor stator is not increased.

In the second embodiment described above, circumferential width of each winding slot opening is the same, but the angles between adjacent winding slot openings is not the same. Alternatively, the angles between adjacent winding slot openings may be the same, but the circumferential width of the winding slot openings is not the same. In the alternative embodiment, winding slot openings are also distributed asymmetrically along a circumferential direction of the rotor core, and the harmonic noise of the motor will be reduced.

In addition, a motor can be provided having at least two of the following features: circumferential width of tooth sections of teeth being different, circumferential width of rib sections of teeth being different, the angles between adjacent rib sections being different, and the angles between adjacent winding slots being different.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electric motor comprising a stator and a rotor rotatably mounted confronting the stator, the rotor comprising a rotor core, the rotor core comprising at least a first tooth, a second tooth adjacent the first tooth and a third tooth adjacent the second tooth, each of said teeth comprising a rib section radially and outwardly extending and a tooth section located at outer end of said rib section, each rib section of said teeth having a radial center line which extends through a center of the rotor, the angle between the radial center line of the rib section of the first tooth and the radial center line of the rib section of the second tooth being n degrees, wherein when the rotor core is rotated n degrees to move the first tooth towards the second tooth, the rotated second tooth does not coincide with the pre-rotated third tooth.

2. The electric motor of claim 1, wherein the angle between the radial center line of the rib section of the first tooth and the radial center line of the rib section of the second tooth is larger or smaller than the radial center line of the angle between the rib section of the second tooth and the radial center line of the rib section of the third tooth.

3. The electric motor of claim 2, wherein one angle between the radial center lines of two adjacent rib sections of the teeth is equal to a base angle defined by dividing 360° by the number of teeth, and at least one angle between the radial center lines of two adjacent rib sections of said teeth is equal to the base angle $+\Delta\theta$, wherein $\Delta\theta$ is from 1% to 40% of the base angle.

4. The electric motor of claim 3, wherein the rotor core comprises twelve teeth, at least one angle between the radial center lines of two adjacent rib sections being equal to 30°, at least one angle between the radial center lines of two adjacent rib sections being equal to 28°, and at least one angle between the radial center lines of two adjacent rib sections being equal to 32°.

5. The electric motor of claim 2, wherein the circumferential width of each of all of the tooth sections is the same.

6. The electric motor of claim 1, wherein the circumferential width of the tooth section of the second tooth is larger or smaller than the circumferential width of the tooth section of the third tooth.

7. The electric motor of claim 6, wherein winding slots are formed between adjacent teeth and have winding slot openings between adjacent tooth sections,
the circumferential width of one winding slot opening being larger than that of another winding slot openings; or
the circumferential width of the winding slot openings being the same, and the all the angles between adjacent winding slot openings are not the same.

8. The electric motor of claim 7, wherein one angle between two adjacent winding slot openings is equal to a base angle defined by dividing 360° by the number of teeth, and at least one angle between two adjacent winding slot openings is equal to the base angle $+\Delta\phi$, wherein $\Delta\phi$ is from 1% to 40% of the base angle.

9. The electric motor of claim 7, wherein the rotor core comprises twelve teeth and twelve winding slots, at least one angle between two adjacent winding slot openings being equal to 30°, at least one angle between two adjacent winding slot openings being equal to 32°, at least one angle between two adjacent winding slot openings being equal to 28°.

10. The electric motor of claim 7, wherein the number of coil turns deposited in the winding slot between said first tooth and said second tooth is larger or smaller than the number of coil turns deposited in the winding slot between said second tooth and said third tooth.

11. The electric motor of claim 1, wherein the circumferential width of the rib section of said second tooth is larger or smaller than the circumferential width of the rib section of said third tooth.

12. A rotor core for an electric motor, comprising at least a first tooth, a second tooth adjacent the first tooth and a third tooth adjacent the second tooth, each of said teeth comprising a rib section radially and outwardly extending and a tooth section located at outer end of said rib section, each rib section of said teeth having a radial center line which extends through a center of the rotor, the angle between the radial center line of the first tooth and the radial center line of the second tooth being n degrees, wherein when the rotor core is rotated n degrees to move the first tooth towards the second tooth, the rotated second tooth does not coincide with the pre-rotated third tooth.

13. The rotor core of claim 12, wherein the angle between the radial center line of the rib section of the first tooth and the radial center line of the rib section of the second tooth is larger or smaller than the angle between the rib section of the second tooth and the rib section of the third tooth.

14. The rotor core of claim 13, wherein the circumferential width of each of all of the tooth sections is the same.

15. The rotor core of claim 12, wherein the circumferential width of the rib section of the second tooth is larger or smaller than the circumferential width of the rib section of the third tooth.

16. The rotor core of claim 12, wherein the circumferential width of the tooth section of the second tooth is larger or smaller than that of tooth section of the third tooth.

17. The rotor core of claim 12, wherein the number of turns deposited in the winding slot between said first tooth and said second tooth is larger or smaller than the number of turns deposited in the winding slot between said second tooth and said third tooth.

18. An electric motor comprising a stator and a rotor rotatably mounted confronting the stator, the rotor comprising a rotor core, the rotor core comprising at least a first tooth, a second tooth adjacent the first tooth and a third tooth adjacent the second tooth, each of said teeth comprising a rib section radially and outwardly extending and a tooth section located at outer end of said rib section, the angle between the first tooth and the second tooth being n degrees, wherein when the rotor core is rotated n degrees to move the first tooth towards the second tooth, the rotated second tooth does not coincide with the pre-rotated third tooth, and
wherein the rotor core comprises twelve teeth, at least one angle between two adjacent rib sections being equal to 30°, at least one angle between two adjacent rib sections being equal to 28°, and at least one angle between two adjacent rib sections being equal to 32°.

* * * * *